United States Patent
Dicke

[15] 3,700,895
[45] Oct. 24, 1972

[54] SCATTERHOLE CAMERA AND METHOD FOR USING SAME INCLUDING THE STEP OF CONVOLUTING THE IMAGE
[72] Inventor: Robert H. Dicke, Princeton, N.J.
[73] Assignee: Research Corporation, New York, N.Y.
[22] Filed: Aug. 14, 1969
[21] Appl. No.: 849,954

[52] U.S. Cl. ............. 250/65 R, 250/71.5 R, 250/105
[51] Int. Cl. ............................................ G03b 41/16
[58] Field of Search ............................... 250/65, 105

[56] References Cited

UNITED STATES PATENTS

| 2,688,095 | 8/1954 | Andrews | 250/65 |
| 3,107,276 | 10/1963 | Cohen | 250/105 |
| 3,259,747 | 7/1966 | Ziegler | 250/105 |
| 3,263,079 | 7/1966 | Mertz | 250/65 |
| 3,412,246 | 11/1968 | Horwitz | 250/105 |

OTHER PUBLICATIONS

" The Role of Optics In Applying Correlation Functions To Pattern Recognition," McLachlan, Journal of the Optical Society Of America, Vol. 52, No. 4 April, 1962, pp. 454– 459

Primary Examiner—James W. Lawrence
Assistant Examiner—C. E. Church
Attorney—Robert S. Dunham, P. E. Henninger, Lester W. Clark, Gerald W. Griffin, Thomas F. Moran, Howard J. Churchill, R. Bradlee Boal, Christopher C. Dunham and Thomas P. Dowd

[57] ABSTRACT

Apparatus and method useful for recording high resolution images of radiation, such as from X-ray or gamma ray-emitting objects, comprising the use of an entrance plate having a number of randomly distributed pinholes which pass the impinging rays from the radiating objects, casting a number of overlapping images of the pinhole pattern on a sensing plate, which may be in the form of a photographic film, spark chamber or other readout or recording means. A comparison of the pinhole pattern with the overlapping image pattern by evaluating their convolution integral, which may be accomplished by one or more optical methods, such as passing radiation through the two patterns as they are successively shifted with respect to each other, or digitally on a computer will provide a high resolution reconstruction of the pattern of the radiation sources in the object field.

20 Claims, 8 Drawing Figures

PATENTED OCT 24 1972
3,700,895
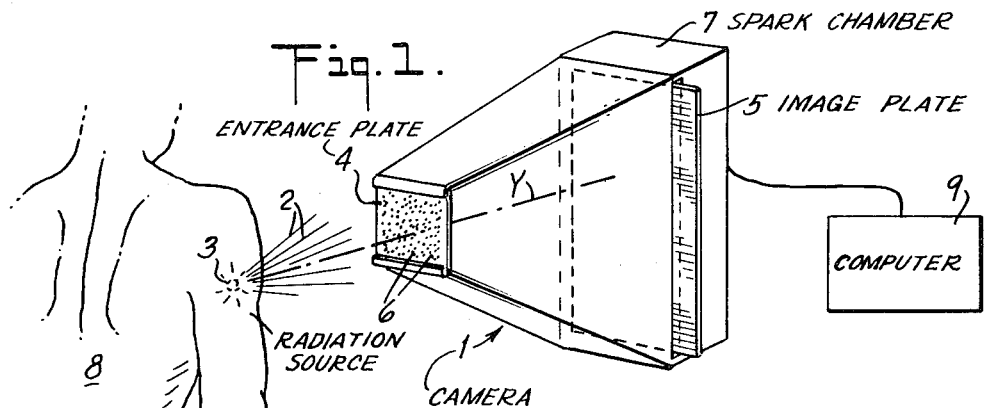
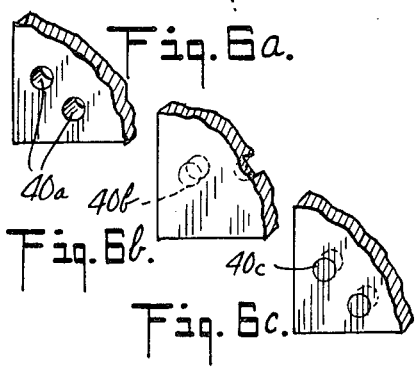
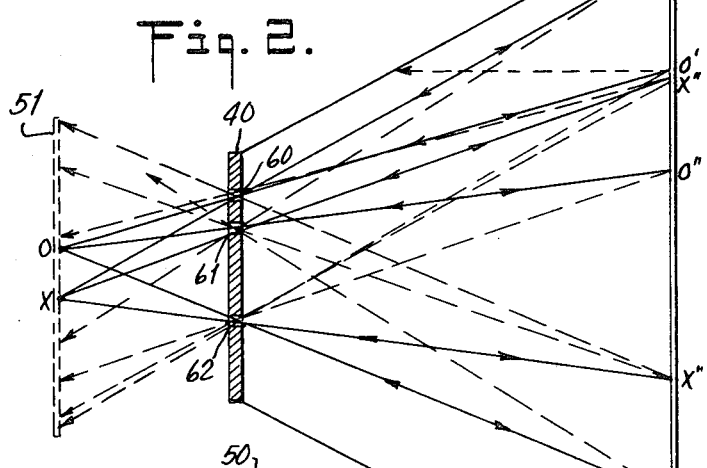
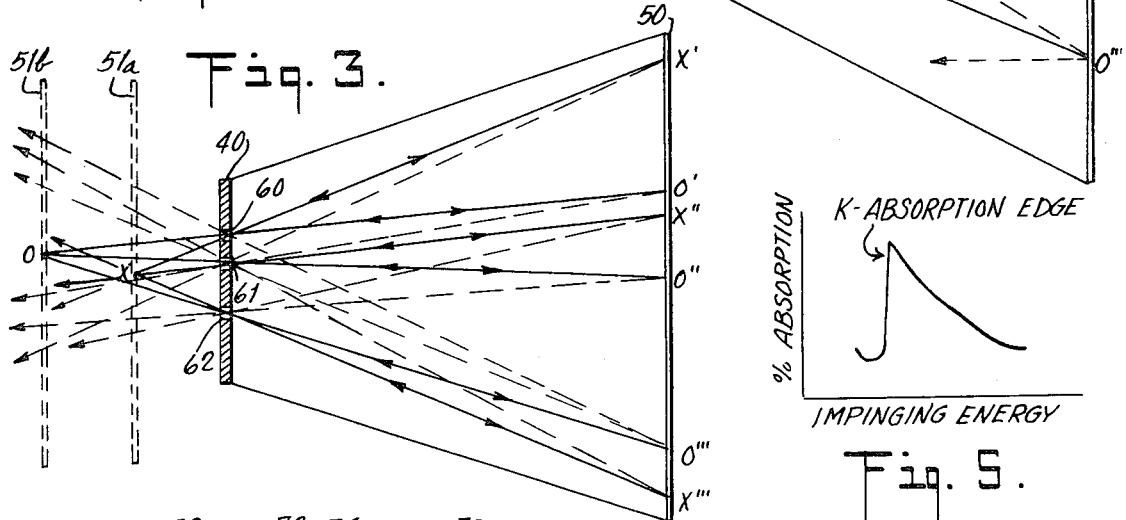
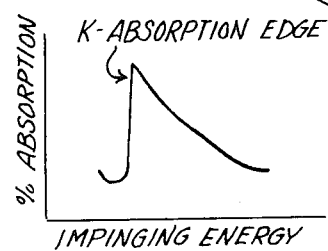
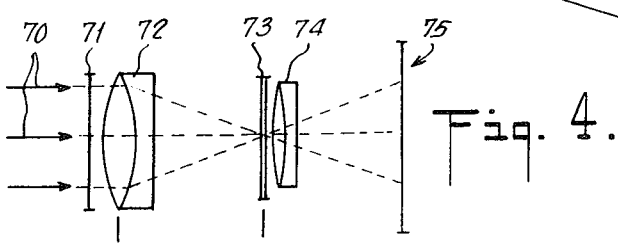
INVENTOR.
ROBERT H. DICKE
BY
Thomas F. Moran
ATTORNEY

SCATTERHOLE CAMERA AND METHOD FOR USING SAME INCLUDING THE STEP OF CONVOLUTING THE IMAGE

BACKGROUND OF THE INVENTION

The present invention relates to the radiation imaging art and more particularly to a method and means for obtaining high resolution X-ray and gamma ray images.

Ordinary optical lenses are generally incapable of imaging X-ray or gamma ray patterns as the comparatively short wavelength of such radiation does not permit the degree of refraction which can be achieved with the rays of comparatively longer wavelength in the visual spectrum. Conversely, while the ordinary pinhole camera is of limited usefulness with radiation in the visual spectral region due to the diffraction of the light waves, such a lensless camera can be used with X-rays and gamma rays, as the diffraction effects are minimal. A pinhole camera then, can yield very sharp X-ray and gamma ray pictures. However, as the pinhole opening must be extremely small for good resolution, an extremely long exposure time is required to obtain an image of practical intensity since a very small percentage of the radiation in the object field will pass through the opening during a given imaging period. If the opening is enlarged, to obtain greater intensity within a shortened imaging period, the extraneous radiation entering the opening will cause the high resolution to be lost. As a result, there has not been, until now, a very satisfactory means for achieving both high resolution and intensity in short wavelength radiation images within a reasonably short exposure time.

The present invention provides a method and means of imaging various radiation but which will particularly give high resolution X-ray and gamma ray images and which permits focusing to obtain images of the radiation patterns in a series of object planes.

SUMMARY OF THE INVENTION

The method and apparatus of the present invention embodies the use of a pinhole camera arrangement having an entrance plate with a number of pinholes to permit a much larger percentage of the impinging radiation to be detected in the imaging plane. The resulting image, when viewing a complex object comprising a number of point sources, is a composite of a corresponding number of displaced and overlapping images of the pinhole pattern. To obtain the pattern of the emitted radiation in the object field, the convolution integral of the overlapping image pattern and the pinhole pattern is evaluated and provides a suitable representation of the complex object capable of high resolution.

The invention is essentially based on a ray optical phenomenon and more particularly, comprises the use of an entrance plate and an image plate which are generally coaxially arranged and of a size and spacing which may be varied to suit the particular application. The radiation may be in any form, either electromagnetic energy or particles, exhibiting ray optical characteristics.

The entrance plate comprises a sheet of material which inhibits, such as by reflecting or absorbing radiation in the energy range of that to be imaged and the pinholes constitute areas in the material which are non-inhibitive of such radiation. The non-inhibitive areas are arranged in a substantially irregular pattern and may be arranged in accordance with a table of random signs. The image plate may be in the form of any particle or photo-sensing surface, such as a photographic plate, a spark chamber, a scintillation screen or the like.

The pattern of the pinholes in the entrance plate may be expressed as a particular mathematical function and the image pattern obtained when viewing a particular object field will be a related function. A comparison of the two functions by convolving, that is, evaluating their convolution integral, electronically in a computer or in some physical manner, such as by variously shifting the two patterns with respect to each other while passing radiation through them, will provide a high resolution image of the object field.

BRIEF DESCRIPTION OF THE DRAWINGS

FIG. 1 is a perspective view of a camera constructed in accordance with the present invention, being used in a diagnostic application;

FIG. 2 is a diagrammatic representation illustrating the operation of a camera such as shown in FIG. 1;

FIG. 3 is a diagrammatic representation illustrating the focusing ability of the camera shown in FIG. 2;

FIG. 4 is an optical system for deconvolving an image obtained with the camera of FIG. 1;

FIG. 5 is a plot of the percentage of radiation absorption versus the impinging energy of the radiation illustrating the K-edge absorption quality of various metals;

FIG. 6a is a fragmentary view of an entrance plate suitable for use in the present invention having holes drilled therein;

FIG. 6b is a fragmentary view of another suitable entrance plate containing areas of non-absorptive material; and FIG. 6c is a fragmentary view of a further suitable entrance plate containing areas of reduced thickness therein.

DETAILED DESCRIPTION OF THE INVENTION

While the method and means of the present invention are capable of use in many applications, such as in X-ray astronomy, microscopy, and information processing, they will be particularly described as applied to the field of diagnostic radiology.

FIG. 1 shows a camera 1, constructed in accordance with the present invention being used to take a diagnostic picture of abnormal tissue in a patient 8 through the use of gamma rays 2 emitted by a radioactive tracer 3, deposited in the tissue. The camera 1, like a simple pinhole camera, comprises an enclosure having an entrance plate 4 at one end and an image plate 5 at the opposite end. The entrance plate 4 is provided with a number of pinholes 6 which may number in the thousands and for some purposes, even many millions. The pinholes 6 are arranged in a substantially irregular pattern and the arrangement may be determined by a table of random signs. The size of the entrance plate 4 may vary from a few centimeters square to very much larger, depending upon the particular application. The size of the holes will similarly vary, for example from a third to a thousandth of a centimeter, depending on the wavelength of the radiation to maintain the ray optical characteristics.

The image plate 5 comprises a sensitive surface such as a film for forming a photograph of the pattern of the impinging radiation, but any radiation sensing means is contemplated such as a spark chamber, a scintillation screen or the like. The radiation pattern formed on the image plate 5 will be an image of the pinhole pattern when the radiating object is a point source at infinity; however, in normal use, since the object field will generally contain a number of radiation sources, the detected image will comprise a corresponding number of overlapping pinhole pattern images, resulting in a blurred composite photo in unresolved form. As the radiation intensity and position of the point sources may differ, the resulting picture obtained with the camera will ordinarily resemble a cloud of varying density containing no recognizable information to the unaided eye. The picture must therefore be "rectified" to present the information contained thereon in a usable or recognizable form. This is achieved in accordance with the present invention by evaluating the convolution integral of the pinhole pattern and the image pattern which will provide a reconstruction of the point source pattern in the object field capable of very high resolution.

The "rectifying" operation may be explained mathematically by considering the use of the camera 1 with a single point source at infinity whose radiation will cast an image of the pinhole pattern on the image plate 5. The pinhole pattern may be defined over the surface of the entrance plate 4 by the function $f(x)$ where $x$ refers to two rectangular coordinates in the plane of the entrance plate. Hence, $f=1$ over a pinhole and $f$ vanishes elsewhere over the entrance plate surface. Then, depending upon the direction of the single point source, at infinity, the image pattern can be characterized by the function $f_1(x)=f(X-x_1)$ where $f_1$ is to be interpreted as a measure of photon distribution or photographic grain density, in the present case, but which may be probability distribution of sparks in a spark chamber, photoelectron distribution, or the like, when other sensing means are being used. The coordinate now refers to coordinates in the image plane and $x$ characterizes the position of the source. The convolution of $f_1$ and $f$ is the integral over the image plane, $g(y)$, and can be expressed as $g(Y)= \int f_1(x)f(x-y)dx = \int f(x-x_1)f(x-y)dx$. (1)

(If the point source is not at infinity, the convolving function $f(x)$ must be replaced by the scaled function $f(ax)$ with a the scale factor.)

Because of the substantially irregular or random distribution of perforations in the entrance plate, the convolution $g(y)$ peaks sharply at $y=x_1$. The convolution integral is a mathematical comparison of the pinhole pattern and image pattern and comprises a successive evaluation of the integral of the product of their two functions $f(x)$ and $f_1(x)$ as the two functions are successively shifted in y with respect to each other. One value of the integral is obtained for each position $y$ of $f_1(x)$ with respect to $f_1(x)$ and the integral $g(y)$ reaches a maximum value when $y=x_1$, that is, when the two functions coincide.

Now, if we assume, for example, that 50 percent of the entrance plate area is perforated, the $g(y)$ is equal to one-half the entrance area when $y$ equals $x_1$ and since $y$ represents successive values of a shift of $f(x)$ with respect to $f_1(x)$ when $y$ is changed by one or more shifts from $x_1$ and $g(y)$ falls (in the mean) by a factor of 2. As the perforation of any given point in the entrance plane is determined by a table of random signs then there is a probability of one-half that a photon passed by a pinhole will reach the site of an image point in the image plane. Thus for $y$ not equal $x_1$ the function $g(y)$ has a value of $g(y) \cong \frac{1}{4}x$ (entrance area). This residual value constitutes a background against which the point source image appears as the peak $g(x_1)=\frac{1}{2}$ in the rectified or reconstructed object field derived from evaluating the convolution integral. The point-to-point fluctuation in the background is determined by $N/2$, the number of holes in the entrance plate, where N is the number of possible hole locations, or by $n$, the total number of counted photons (i.e., developed photographic grains, sparks in a spark chamber, photoelectrons, etc.), depending upon which is the smaller. Now if we consider the case $n < N/2$, the background photon count $b$ will be $n/2$ and the rms fluctuation in the background neglecting the instrumental and continuous X-ray or gamma-ray background counts is $$\sim \sqrt{(n/4)}. \qquad (2)$$

The probability that at any given location (with $y \neq x_1$) the fluctuation in background yields a peak as great as the true image is $(1/2)^n$. The number of possible locations of the image can be as great as N, and the probability that no false peak appears anywhere out of a total of N locations is $$[1-(1/2)^n]^N \sim \exp(-N/2^n). \qquad (3)$$

For no false peak to appear (with a 99 percent confidence limit) requires the detection of $$n \geq \log(10^2)/\log 2$$

photons. For $N=10^6$, $n \geq 27$.

A figure of merit can be defined for an imaging system as the reciprocal of the ratio of the time required to obtain an image to the time required by a scanning collimator (a poor camera) of the same entrance dimensions. For the above case of a single point source with $10^6$ possible locations, this figure of merit is approximately $1.9 \times 10^4$, the collimator requiring $1.9 \times 10^4$ times as long to obtain the same picture.

For a complex object composed of may point sources, all sources contribute to the background level, and the fluctuation in background is increased. More exposure time is then required for an image to be free of false peaks. For s equal-intensity point sources, the individual image peaks have intensities (photon counts) of $(1 + s^{-1})b$ where $b$ in this case is the average background count. The peak height above background is $s^{-1}b$, where the average background count is $$b = \frac{1}{2} sn, \qquad (4)$$

$n$ again representing the number of detected photons from a single source. For a large background count $b$ the fluctuation in background is Gaussian in distribution, and, at a given location, the probability of a deviation $\Delta b$ from the mean count $b$ is $$P(\Delta b) = \frac{1}{\sqrt{(\pi b)}} \exp\left[-\frac{(\Delta b)^2}{b}\right] \quad (5)$$

To avoid confusion between radiation point sources, fluctuations should satisfy $$\Delta b \leq s^{-1} b \quad (6)$$

For a spurious source not to appear (with a 99 percent confidence limit) in a total of N possible sites requires $$\int_{\Delta b}^{\infty} P(\Delta b) d(\Delta b) \leq 10^{-2} N. \quad (7)$$

For $N=10^6$, equation (7) requires $$(\Delta b)^2 \geq 15.7 b. \quad (8)$$

From equations (6) and (8), with $s \gg 1$.

$$b \geq 15.7 s^2, \quad (9)$$

From equations (4) and (9), $$n \quad 31.4s, s \gg 1, sn < N/2. \quad (10)$$

The second inequality arises from the requirement that the total photon count not exceed $N/2$ which was assumed in deriving eq. (2). This inequality limits s to a maximum of approximately $10^2$ for $N=10^6$. For $s = 10^2$, $n \geq 3.14 \times 10^3$ and the figure of merit is 320.

If there is a range of intensities in the point sources, fewer can be simultaneously detected. As an example, with two sources and $N=10^6$, the dim source can be detected if it has more than 1 percent of the intensity of the bright source. fifty dim sources of equal brightness can be detected if their individual intensities exceed 2 percent that of the bright source.

As will be discussed more fully hereinafter, a 50 percent area performation or hole coverage would be used only when imaging a comparatively few point sources.

The foregoing mathematical explanation may perhaps be better understood upon considering the graphic example shown in FIG. 2. For the purposes of this example, the entrance plate 40 is provided with three pinholes, 60, 61 and 62 and the object comprises two point sources X and O lying in the same object plane. The rays emitted by the two sources are indicated by solid lines and pass through the respective pinholes, striking the image plate 50 at the various points X'–O''' shown. The resulting image comprises six points, that is, the number of sources times the number of pinholes, which amount to two images of the pinhole pattern resulting from the rays from the two point sources. It will be seen that as the number of sources or pinholes is increased, the number of images and the amount of image overlapping increases directly. It will be seen further that the geometry and spacing of the entrance and image plates 40 and 50 may be suitably varied to accommodate to the dimensions of the object field being viewed.

Now let us consider that the resulting image on the image plate 50 is made into a positive representation such that the image points X'-O''' become pinholes and light (or shorter wavelength radiation to avoid diffraction effects) is directed back through the image holes. In this case, since the entrance plate 40 and the image plate 50 geometry remains fixed, this operation will be the equivalent of determining the convolution integral with $y=x_1$. Of the rays coming from the image point holes, only 18 that is, the number of image holes times the number of entrance plate holes, will pass back through the entrance plate 40. If another image plate 51 is placed in the plane of the original radiation point sources, however, only fourteen points will be imaged, since six of the rays will retrace the path of the original image-creating rays converging in sets of three into two points at the location of the original point sources X and O. The other 12 rays produce points at random over the image plate 51. It will be seen that the two source points X and O will have an intensity on the plate 51 three times greater than any one of the other random points and the magnitude of the intensity difference will increase with the number of pinholes in the entrance plate 40. Thus, by using a plate with a large number of pinholes, the contrast between the source images and the background can be greatly increased and a high resolution image of the original two radiating point sources X and O can be obtained.

Since in practical situations, the exact arrangement of the entrance pattern and reproduced image pattern may not be maintained as in our example, the two patterns will necessarily have to be displaced or shifted with respect to each other while passing radiation through them until the maximum intensity peaks are obtained in the object field. This displacing operation is then a mechanical means of evaluating the convolution integral of the two patterns to establish $y=x_1$, which is the case when the intensity peak is obtained.

Applying this method to the arrangement shown in FIG. 1, it will be seen that radioactive tracers deposited in abnormal tissue can be pinpointed by making up a reference image pattern, using a reference point source positioned effectively at infinity along the central axis Y of the camera 1. The reference image pattern may then be placed in the position of the image plate 5 with a gamma ray sensing means, such as a spark chamber 7, positioned immediately behind it. The patient 8 is then scanned using the same entrance plate 4 until the signal from the spark chamber 7, resulting from passage by the reference pattern of the gamma rays 2 emitted by the radioactive tracer 3, and fed to a suitable computer 9, reaches a peak value. At this point, the maximum amount of radiation is being passed so that the radiation source, the entrance plate 4, and the reference image pattern are in the identical arrangement with respect to each other as when the reference pattern was made. Therefore, the radiation source which is now the radioactive tracer 3, must lie along a line coincident with the central axis Y of the camera 1.

The camera of the present invention is also capable of focusing so that the position of the tissue in depth may be determined. For example, as shown in FIG. 3, using the camera discussed in FIG. 2, with a small depth of focus, an image pattern X' - X''' is obtained on plate 50 using the two point sources X and O in different object planes. It will be seen from the figure that if the reconstruction operation is performed using a plate 51a located in the plane of the point source X, the retraced rays to the point X converge to create an intensity peak at that point on the plate 51a, while the retraced rays to the point source O will be somewhat dispersed among the background rays. Conversely, if a plate 51b is placed in the same plane as the original point source O, an intensity peak will occur at the original position of O, due to convergence, while the retraced rays through X will be dispersed. Therefore, if the reference point source is positioned a short distance from the entrance plate 40, when the peak signal is obtained during scanning, the tracer 3 will be located at an identical distance from the entrance plate 40.

In actual practice, the camera 1 will not generally be used for deconvolving but rather a photograph will be obtained using the camera 1 and the photograph will be deconvolved using optical means. A preferred form of optical apparatus for deconvolving the image is shown in FIG. 4. From the left, it comprises some means (not shown) of providing collimated and reasonably monochromatic light 70, a photograph in the from of a positive image or transparency 71, a first lens 72 for focusing the collimated light to form a star-like pattern on a correcting plate 73 and a second lens 74 for forming a deconvolved image of the transparency 71 on an image plane at which may be placed an imaging means 75, such as, a photographic film, the sensitive surface of a television camera or the field lens of an ocular for visual observation of the deconvolved image.

The image transparency 71 is opaque except for a set of holes giving arrival locations of detected photons. It may be reduced or increased in size from that of the original image. The correcting plate 73 is derived from the hole configuration of the entrance plate of the camera, using means familiar to optical physicists. It may correct for both amplitude and phase or only amplitude. A simple and convenient means for developing an amplitude correcting plate involves in part the placement of photographic film at the location of plate 73 in the system of FIG. 4 and photographing the collimated light 70 through the first lens 72 with the transparency 71 replaced by a suitable and appropriately scaled copy of the entrance plate used to make the transparency 71.

The necessity or desirability of phase correction by the correcting plate 73 can be eliminated by incorporating the appropriate symmetry in the aperture configuration of the entrance plate.

The camera 1 is also capable of use without the need for any photographic operation by merely positioning the spark chamber 7 in the imaging plane. This would be the case if the particular image plate 5 shown in FIG. 1 was removed. The radiation impinging on the spark chamber 7 will produce an image pattern function electronically, which may be fed to the suitable digital computer 9. The computer 9 may contain the pinhole pattern function. The convolution integral of these two functions can then be evaluated electronically in the computer 9 and the object field pattern may be determined for each scanning position of the camera 1.

Those skilled in the art will see many other analogue devices for evaluating the convolution integral such as an analog computer.

Thus by using an irregularly perforated entrance plate, a characteristic image can be obtained which may be used with the plate in many and various systems and arrangements to obtain an evaluation of their convolution integral. This integral provides a reproduction of the object field that was imaged and can be used to obtain an image of much higher resolution than has been heretofore possible with comparatively short wavelength radiation.

For a clear understanding of the invention then, the features of the entrance plate should be particularly understood. Although the entrance plate has been generally described as a solid plate having holes or perforations therein, it will be appreciated that particularly when dealing with short wavelength radiation, such as X-rays and gamma rays, the plate may be penetrated by the rays whether or not a hole has been manufactured at the point of penetration. Thus, when we consider portions of the entrance plate as being opaque to the incident radiation and portions of the plate as having holes therein to pass the radiation, we are in essence considering whether the radiation is, or is not, prevented from reaching the image plate by the material of the entrance plate. The factors which determine whether or not the radiation will be so blocked or inhibited are the particular energy of the radiation and the thickness and nature of the plate material.

The radiation inhibiting ability per unit thickness of a particular material is related to its atomic number, so that materials of higher atomic number, for example, lead, are generally used to block high energy rays, such as X-rays and gamma rays. When dealing with the higher of the high energy rays, an increase in thickness of the material is required for properly inhibiting these rays. As the camera of the present invention is suitable for use with radiation over a broad energy spectrum, the entrance plate must be constructed from a material which will inhibit the rays in the particular energy band being imaged, so as to permit only those rays arriving at the pinholes to be passed to the image plate.

A particular method of minimizing the required thickness of the entrance plate is to take advantage of the different "K-edge absorption" values of various materials in determining which material is most suitable for use with the particular energy range of the rays that are to be imaged. The K-edge absorption is an abrupt increase in the plot of the amount of absorption of a particular material versus the range of impinging energies as shown in FIG. 5. The K-edge absorption value of any given material is related to its atomic number, or charge on the nucleus, Z, in the following relationship:

$$E = Z^2 \times 13.6$$

where $E$ is the energy of the radiation which will be absorbed by the given material expressed in terms of electron-volts. Thus, when it is desired to image gamma rays of X-rays of a given energy range, the appropriate energy value may be inserted and the equation solved for Z. The Z value will provide an indication of the material, such as a particular metal having the most desirable absorptive qualities and whose use will avoid the need for increasing the thickness of the entrance plate, as would be necessary if a different metal were used.

In applying this method in the situation when the camera 1 is being used in connection with diagnostic X-rays of gamma rays, as in FIG. 1, the following procedure can be followed. The camera 1 is particularly useful in making scattered X-ray pictures as well as shadow pictures. Various dyes are known in the radiological art as special scatterers which will produce a known output energy radiation for a given energy of incident radiation.

Thus, the organ or tissue to be studied may be impregnated with a particular dye and the energy of the scattered radiation determined. The most desirable material for the entrance plate 4 is then selected as the one having a K-edge absorption energy as little a possible above the scattered energy level. As the K-edge absorption refers to a sharp incline in the curve of the relationship between the amount of absorption of a particular material and a range of impinging energies, impinging rays with energies just beyond the edge value will encounter maximum absorption, while those rays just before the edge will experience comparatively little or no absorption so that the material is essentially transparent to them. A number of different plates may be made up of various materials for use in a given camera. The appropriate plate may then be inserted in the camera for the particular energy range of radiation which is to be imaged.

With regard to the pinholes in the entrance plate, it will be seen from the foregoing discussion that they need not be actual manufactured holes 40a in the entrance plate material (as shown in FIG. 6a), but may also be created by varying the thickness of the material (as at 40b in FIG. 6b) or the nature of the material (as at 40c in FIG. 6c) in the particular areas through which the impinging radiation is desired to be passed. With this understanding, the particular features of the pinholes will now be discussed.

In our previous example in connection with the mathematical analysis, the hole coverage on the entrance plate was taken to be 50 percent, that is, half the area of the entrance plate was adapted to pass the impinging radiation and half was adapted to inhibit radiation. Good image resolution can be obtained using such a percentage of hole coverage if the object field contains relatively few point sources of radiation. However, as the object becomes more complex, the percentage of hole coverage should be reduced accordingly to achieve improved "signal-to-noise." The size of the particular pinholes, that is, the width and depth, will be determined by the size of the object to be imaged, the energy or wavelength of the radiation and the depth of focus of the camera. For a short depth of focus, a smaller aperture should be used. The depth of the hole of course, will be dependent upon the thickness of the plate and should be considerably larger than the wavelength of the impinging radiation. For some purposes, it is desirable to build collimation into the entrance plate, so that the depth of the holes may be increased to limit the viewed solid angle and hence to reduce the unwanted background from extraneous radiation sources in the object field. Collimation can be achieved with a thick entrance plate having holes drilled therein, or by stacking a number of identical perforated entrance plates.

As previously indicated, the preferred arrangement of the holes is in a substantially irregular configuration, and a completely random configuration may be used in accordance with a table of random signs. However, some regularity in the hole arrangement is permissible. One method of changing image quality, while somewhat reducing the randomness of the holes, is to prevent any two holes from being immediately contiguous, so as to touch each other. This may be accomplished by initially arranging the holes over the entire area of the entrance plate in accordance with a table of random signs. Then, the entire area may be subdivided and any particular subdivision which contains holes which touch, may be rearranged again in accordance with a table of random signs, so as to have no two holes touching each other. These operations may be accomplished in a suitable computer which could be used to control a plate-punching device. The resulting entrance plate will have a hole pattern which is basically irregular but which may have some regularity. With such a plate, the image of any large object may then be reproduced in sharp contrast with its immediately surrounding area.

It should be pointed out that this randomly perforated plate essentially differs from the conventional fly's-eye lens, whose components are generally arranged in a regular pattern. Also, a number of overlapping images is obtained with the entrance plate of the present invention as contrasted with the matrix of distinct minute images produced by a fly's-eye lens.

It should be realized further that the apparatus and method of the present invention can have broad applications in the field of optical information processing. In contrast to the holographic techniques presently being used in this field and which use interference effects requiring coherent radiation, the present invention uses ray optic effects so that incoherent radiation can be used and still produce adequate resolution; and while excellent resolution is obtained with shorter wavelength radiation due to the lack of diffraction effects, even radiation in the visual spectrum may be imaged in certain applications.

A method and means is therefore presented for analyzing radiation patterns over a broad energy spectrum and through which high resolution images may be obtained for use in a wide range of optical applications while obviating the need for expensive, sophisticated equipment and even the use of conventional lenses.

What is claimed is:

1. A method of analyzing a source of rays making up a radiation image comprising the steps of:

a. interrupting the travel of rays from the source which arrive at certain areas on a surface comprehending the image and passing rays from the source arriving at other areas of the surface, said other areas being arranged in a substantially random pattern over the total area of the surface and being of such dimensions with respect to the wavelengths of said radiation that diffraction effects are essentially avoided;

b. sensing the resulting pattern of the passed rays at a selected distance beyond said surface; and b. evaluating the convolution integral of said substantially random other area pattern and said sensed passed ray pattern to obtain an indication of the location of the source of the rays.

2. Method as in claim 1, wherein said other areas of said random pattern are arranged in accordance with a table of random signs.

3. Method as in claim 1, wherein the evaluating of the convolution integral is performed in a digital computer.

4. Method as in claim 1, wherein the evaluating of the convolution integral is performed by optical means.

5. A method of analyzing the pattern of radiation in an object field, comprising the steps of:
   a. placing a radiation-inhibiting material in the path of rays comprising the radiation pattern;
   b. passing those rays of the radiation pattern that arrive at certain non-inhibiting areas in the material, which areas are arranged in a substantially random pattern and are of such dimensions with respect to the radiation wavelengths as to substantially avoid diffraction effects;
   c. sensing the pattern of the passed rays at a selected distance beyond the material; and
   d. comparing the sensed pattern of the passed rays with the random pattern of the non-inhibiting areas by convolving to determine the radiation pattern in the object field.

6. Method as in claim 5, wherein the inhibiting material is selected in accordance with its K-edge absorption value so as to absorb radiation at the energy level of the arriving rays.

7. Method as in claim 5, wherein the convolving is performed by passing radiation through means containing the random pattern of the non-inhibiting areas and means containing a positive of the sensed pattern of the passed rays.

8. A method of reproducing the arrangement in an object field of sources of radiation in a given energy range comprising the steps of:
   a. intercepting a portion of the rays comprising said radiation from said sources on the surface of a material which blocks radiation in the given energy range;
   b. passing that portion of the rays making up said radiation that arrives at certain non-blocking areas in the material which areas are arranged in a substantially random pattern and are of such dimensions that said rays are passed while avoiding diffraction effects;
   c. sensing the pattern of the passed rays from the object field in a field beyond the material;
   d. evaluating the convolution integral of said random pattern of the non-blocking areas and said sensed pattern of the passed rays to reproduce the radiation source arrangement.

9. Apparatus for obtaining an image of the pattern of radiation in an object field comprising:
   a. an entrance plate of radiation-inhibiting material having a plurality of non-inhibiting areas therein arranged in a substantially random pattern and whose dimensions are such with respect to the wavelengths of said radiation as to substantially avoid the diffraction of rays of said radiation passing therethrough.
   b. means in a field beyond said plate for sensing the pattern of the rays from the object field which are passed by said non-inhibiting areas in the entrance plate; and
   c. means for comparing the random pattern of said non-inhibiting areas and said sensed passed ray pattern by convolving to determine the pattern of radiation in the object field.

10. Apparatus as in claim 9, wherein said non-inhibiting areas of said random pattern are arranged in accordance with a table of random signs.

11. Apparatus as in claim 9, wherein the entrance plate is a sheet of material having holes therein.

12. Apparatus as in claim 9, wherein said entrance plate is a sheet having a substantially uniform thickness with areas of decreased thickness which are non-inhibiting.

13. Apparatus as in claim 9, wherein said entrance plate is a sheet of radiation-inhibiting material, having areas of non-inhibiting material therein.

14. Apparatus as in claim 9, wherein said entrance plate is of a material whose K-edge absorption value is in the range of the energy of said radiation.

15. Apparatus as in claim 9, wherein the sensing means is a photographic plate.

16. Apparatus as in claim 9, wherein the sensing means is a spark chamber.

17. Method as in claim 8, wherein the convolution integral is evaluated by relatively shifting said sensed pattern of the passed rays with respect to said random pattern of the non-blocking areas and passing radiation from an external source through the two patterns at different relative positions.

18. Apparatus as in claim 9, wherein the means for comparing by convolving is a digital computer.

19. Apparatus as in claim 9 wherein the means for comparing by convolving is an optical means.

20. A camera for imaging the arrangement of X-ray sources in an object field comprising:
   a. a surface at the entrance of the camera inhibitive to radiation at X-ray energies with a plurality of areas therein arranged in a random pattern which are non-inhibiting to and non-diffractive of radiation in the X-ray energy range;
   b. means within the camera for sensing the pattern of the radiation passed by said non-inhibiting areas of said surface;
   c. means for comparing the pattern of said non-inhibiting areas with the pattern of the passed radiation sensed at said sensing means, by evaluating their convolution integral; and
   d. means for providing a graphic representation of the evaluation of said convolution integral to provide an image of the pattern of the sources of X-rays in the object field.

* * * * *

UNITED STATES PATENT OFFICE
CERTIFICATE OF CORRECTION

Patent No. 3700895            Dated October 24, 1972

Inventor(s) Robert H. Dicke

It is certified that error appears in the above-identified patent and that said Letters Patent are hereby corrected as shown below:

Column 4, line 53, at the end of the line, "may point" should read --many point--;

Column 5, line 35, the equation 10, "n   31.4s,s>>1,sn<N/2" should read as follows: --$n \geq 31.4s, s \gg 1, sn < N/2$--; and Column 7, line 31, "from" should read --form--.

Signed and sealed this 10th day of April 1973.

(SEAL)
Attest:

EDWARD M. FLETCHER, JR.            ROBERT GOTTSCHALK
Attesting Officer                    Commissioner of Patents